V. B. ROGERS.
CUFF LINK.
APPLICATION FILED JAN. 25, 1919.
1,387,557. Patented Aug. 16, 1921.
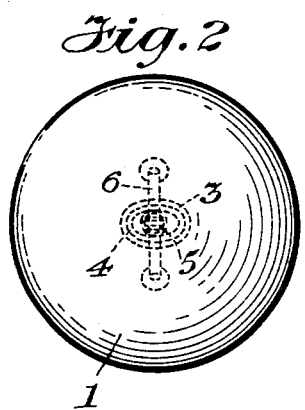
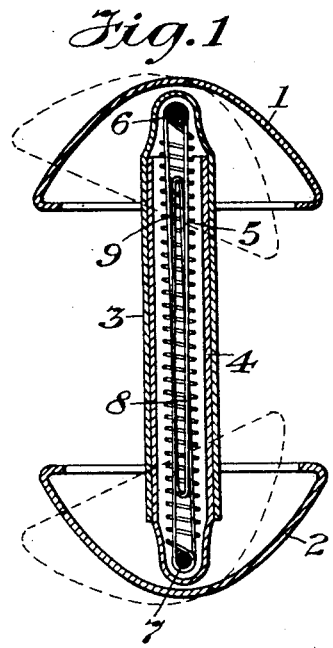
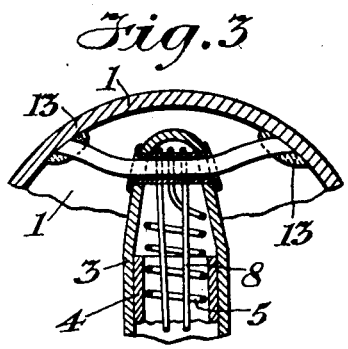
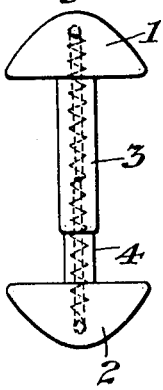
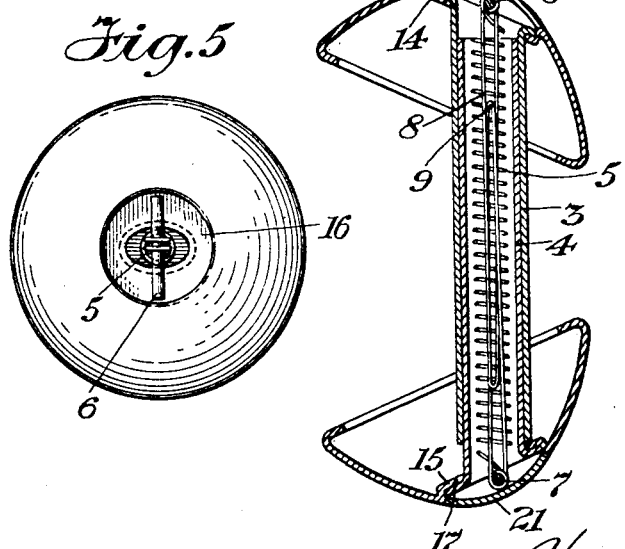
INVENTOR
Victor B. Rogers
BY
George C. Leau ATTORNEY

UNITED STATES PATENT OFFICE.

VICTOR B. ROGERS, OF NEW YORK, N. Y.

CUFF-LINK.

1,387,557. Specification of Letters Patent. Patented Aug. 16, 1921.

Application filed January 25, 1919. Serial No. 273,011.

*To all whom it may concern:*

Be it known that I, VICTOR B. ROGERS, a citizen of the United States, and resident of New York city, in the county of New York and State of New York, have invented certain new and useful Improvements in Cuff-Links, of which the following is a specification.

My present invention relates to cuff links of the type in which the shank is composed of two telescopic members, which are yieldingly held in the telescoped position, preferably by means of a retractile spring. The object of such construction is to hold the ends of the cuffs close together, yet to permit separation of the ends and sliding of the cuff up on the arm without removing the links from the holes in the cuffs. One form of such cuff link is shown in Patent No. 1227864, granted May 29th, 1917.

In cuff links constructed upon this principle, the amount of possible expansion of the links can never be more than twice the length of the shank when in its contracted position. This length is strictly limited in practice because users want the free ends of the cuff to be brought into contact and this requires that the clamping surfaces of the heads be not much over one-half to five-eighths inch apart.

The purpose of my present invention is to improve cuff links of this type in various ways. One feature of my invention consists in shaping the heads of the link in a dome form, the telescoping shank members being connected inside near the top of the dome and the base of the dome being utilized as the bearing surface for the cuff. This makes it possible to use a much longer shank for a given distance of separation of link heads.

Another feature of my invention consists in improved means for limiting the maximum expansion of the telescoping members. For this purpose I employ interlinked loops, extending through the shank, one loop being secured to one link head and the other to the other link head, the loops freely overlapping at the center when the shank is in the telescoped position, and engaging each other after the manner of chain links when in the fully extended position.

Other features of the invention relate to improved means for securing the telescoping shank sections to the link heads.

The nature and objects of my invention will be more evident, from the following description in connection with the drawings in which—

Figure 1 is a vertical section, through to the guides, longitudinally at the shank.

Fig. 2 is an endwise view of the device shown in Fig. 1.

Fig. 3 is a detailed section at right angles to the plane of Fig. 1.

Figs. 4 and 5 are reviews respectively similar to Figs. 1 and 2, but showing a modified construction.

Fig. 6 is an elevation of the link in partly expanded condition.

The cuff link comprises the heads 1, 2 and the intermediate shank composed of telescoping members 3, 4. These members are preferably oval in cross section so as to prevent possibility of axial rotation of one upon the other. Within the telescoping sections is the retractile spring 5, secured at the ends to pins 6, 7. Expansion of the shanks is limited and disengagement of the telescoping sections prevented by the interlinked loops 8, 9, which are preferably of wire and which are preferably secured at their ends to the same part to which the ends of the retractile spring are secured. While the spring and loop ends may be directly connected to the pins 6, 7, as shown in Fig. 4, I prefer in some cases to interpose sleeves or hollow rivets. This is particularly desirable where the telescoping shank sections are pivotally secured to the heads.

The details of the pivotally connected arrangement will be evident from Figs. 1 and 3. One desirable method of assembling this structure is to use oval tubes for the telescoping sections, insert the spring and the loops, insert the hollow sleeves or rivets, secure the spring at proper tension and the links at proper length to said hollow rivets, flatten and spin or hammer over the ends of the tubes as indicated in Fig. 3, and then rivet over the ends of the hollow sleeve or rivet as shown in the same figure. The pivot wires 6, 7 may be then inserted and their ends secured by soldering, as at 13, Fig. 3.

In the modified form shown in Figs. 4 and 5 the shank sections are rigidly secured to their respective heads at the desired predetermined inclination. In this form, the heads are first stamped with a shallow central recess at the center, and annular depressed lips 14, 15 affording a firm seat for the out-turned flanges 16, 17 formed on the tubular shank sections. In practice, these parts are assembled and brazed together, so that each head becomes substantially integral with its shank section. The shank sections are then telescoped, the springs and loops inserted and their ends engaged with the pins 6, 7. If desired, the latter may be held in the position shown by having their ends soldered. The links may then be completed by having the crown plates 20, 21 sprung, stamped or brazed in place.

It will thus be seen that I have provided a cuff link having clamping surfaces close enough together to bring the edges of an ordinary cuff into normal contact when in the telescoping position, and yet permitting expansion of the link to draw the cuff back over the forearm of the muscles of the average user by providing heads and an intermediate expansible shank, such shank comprising telescoping members, and a spring within said shanks extending substantially from end to end thereof to hold the telescopic sections in the telescope position, said heads being in the form of relatively deep domes or cups with the rims of the cups arranged as clamping surfaces for the cuff, the respective telescoping sections being secured at the deepest point of the dome or cup, and the depth of the cup at said point being such that the distance of separation of the cuff clamping surfaces when the telescoping sections are in the expanded position is much more than twice the separation of said clamping surfaces when the telescoping sections are in the normal contracted position.

I claim:

1. In a cuff link, heads and an intermediate expansible shank, such shank comprising telescoping members, and a spring within said shanks extending substantially from end to end thereof to hold the telescopic sections in the telescope position, said heads being in the form of relatively deep domes or cups with the rims of the cups arranged as clamping surfaces for the cuff, the respective telescoping sections being secured at the deepest point of the dome or cup, and the depth of the cup at said point being such that the distance of separation of the cuff clamping surfaces when the telescoping sections are in the expanded position is much more than twice the separation of said clamping surfaces when the telescoping sections are in the normal contracted position.

2. In a cuff link, heads and an intermediate expansible shank, such shank comprising telescoping members, a retractile spring and expansion limiting loops within such telescoping members the outer end of each telescoping member being flattened and having a hollow sleeve riveted therethrough to which the outer ends of such spring and loops are secured.

3. In a cuff link, heads and an intermediate expansible shank, such shank comprising telescoping members, a retractile spring and expansion limiting loops within such telescoping members the outer end of each telescoping member being flattened and having a hollow sleeve riveted therethrough to which the outer ends of such spring and loops are secured, together with means for securing such shank sections to said heads, said means comprising pivots extending through said hollow sleeves and secured to the respective heads.

Signed at New York city in the county of New York, and State of New York this 24th day of January, A. D. 1919.

VICTOR B. ROGERS.